(12) United States Patent
Peng

(10) Patent No.: US 12,077,132 B2
(45) Date of Patent: Sep. 3, 2024

(54) BRACKET CONNECTING STRUCTURE AND TRANSPORTATION BRACKET

(71) Applicant: Cheng Peng, Zhongshan (CN)

(72) Inventor: Cheng Peng, Zhongshan (CN)

( * ) Notice: Subject to any disclaimer, the term of this patent is extended or adjusted under 35 U.S.C. 154(b) by 0 days.

(21) Appl. No.: 18/416,893

(22) Filed: Jan. 19, 2024

(65) Prior Publication Data

US 2024/0157885 A1 May 16, 2024

(30) Foreign Application Priority Data

Jan. 9, 2024 (CN) .......................... 202420059337.9

(51) Int. Cl.
*B60D 1/24* (2006.01)
*B60R 9/06* (2006.01)
*B60R 9/10* (2006.01)

(52) U.S. Cl.
CPC ................ *B60R 9/10* (2013.01); *B60D 1/241* (2013.01); *B60R 9/06* (2013.01)

(58) Field of Classification Search
CPC .............. B60D 1/241; B60R 9/06; B60R 9/10
USPC ...................................................... 280/506
See application file for complete search history.

(56) References Cited

U.S. PATENT DOCUMENTS

| 6,951,287 | B1 * | 10/2005 | Randazzo | B62H 3/04 403/379.3 |
| 6,974,147 | B1 * | 12/2005 | Kolda | B60R 9/10 280/506 |
| 8,833,791 | B2 * | 9/2014 | Prescott | B60D 1/07 280/506 |
| 11,214,203 | B2 * | 1/2022 | Wang | B60R 9/10 |
| 2006/0186638 | A1 * | 8/2006 | Varner | A63B 71/023 280/506 |
| 2007/0040087 | A1 | 2/2007 | Barron | |
| 2019/0009809 | A1 | 1/2019 | Newenhouse | |
| 2019/0071024 | A1 * | 3/2019 | Uebler | B60R 9/06 |
| 2020/0114946 | A1 | 4/2020 | Newenhouse | |

FOREIGN PATENT DOCUMENTS

WO WO-2014018616 A2 * 1/2014 ............... B60D 1/42

* cited by examiner

*Primary Examiner* — Scott T McNurlen
(74) *Attorney, Agent, or Firm* — Zhigang Ma

(57) ABSTRACT

The present disclosure provides a bracket connecting structure. The bracket connecting structure includes a bracket mounting piece, a mounting tube connected with the bracket mounting piece, and a locking assembly arranged on the mounting tube. The locking assembly includes a locking piece, a driving piece and a driving fitting piece which are arranged in the mounting tube. The locking piece is arranged in the mounting tube in rotating connection with the mounting tube. The driving fitting piece is rotatably connected with the locking piece. The driving piece runs through the mounting tube and is adaptively connected with the driving fitting piece.

18 Claims, 5 Drawing Sheets

BRACKET CONNECTING STRUCTURE AND TRANSPORTATION BRACKET

TECHNICAL FIELD

The present disclosure relates to the technical field of vehicle-mounted brackets, specifically, in particular to a bracket connecting structure, and a transportation bracket including the bracket connecting structure.

BACKGROUND

With the development of scientific and technological level and the improvement of people's living standards, people pay more and more attention to pursuing healthy lifestyles in convenient and efficient life.

Automobiles and other traffic facilities provide quick trips for us, but cannot meet people's health needs. Riding outdoors properly is a kind of leisure sports that people generally choose, but is usually limited by the environment, so cycling cannot be arbitrary. A perfect solution that driving an automobile with a bicycle during traveling has been emerged.

Nowadays, bicycle racks are becoming more and more common in automobiles. Bicycles can be mounted on automobiles through bicycle brackets, so that bicycles are convenient to carry during traveling. However, the existing bicycle bracket has more or less problems. For example, the connecting structure between the bicycle bracket and the automobile is complex and inconvenient, and the mounting operation needs a lot of time, or the connecting structure is unstable and easy to cause damage, so that the existing bicycle bracket is difficult to meet people's use needs.

SUMMARY

In view of the above content, the present disclosure aims to solve at least one of the technical problems existing in the prior art. Therefore, the present disclosure also provides a bracket connecting structure, and a transportation bracket using the bracket connecting structure. The structure is stable and convenient to mount, the bracket mounting efficiency can be improved, and the structure is simple, so that the bracket connecting structure and the transportation bracket are suitable for large-scale application in industrial production.

Therefore, in the first aspect, the embodiment of the present disclosure provides a bracket connecting structure, including a bracket mounting piece, a mounting tube connected with the bracket mounting piece, and a locking assembly arranged on the mounting tube. The locking assembly includes a locking piece, a driving piece and a driving fitting piece which are arranged in the mounting tube. The locking piece is arranged in the mounting tube in rotating connection with the mounting tube. The driving fitting piece is rotatably connected with the locking piece. The driving piece runs through the mounting tube and is adaptively connected with the driving fitting piece. An opening corresponding to the locking piece is formed in the mounting tube. The driving fitting piece is configured to be driven by the driving piece to drive the locking piece to rotate relative to the mounting tube, so that the locking piece partially extends out of or receive into the opening.

Preferably, the locking assembly also includes a base. The base is detachably mounted at one end of the mounting tube. The locking piece is accommodated in the base and rotatably connected with the base. An open hole corresponding to the opening is formed in the base.

Preferably, the axial direction of relative rotation of the locking piece and the driving fitting piece and the axial direction of relative rotation of the locking piece and the mounting tube are vertical to the length direction of the mounting tube, respectively.

Preferably, the locking piece includes a body part and a rotating part fixedly connected with the body part. The body part is rotatably connected with the driving fitting piece. The rotating part is rotatably connected with the base. The driving fitting piece can drive the body part to move so as to drive the rotating part to rotate relative to the base, so that an end part, away from the rotating part, of the body part extends out of or receives the opening.

Preferably, a first shaft hole is formed in the body part. The driving fitting piece is correspondingly accommodated in the first shaft hole. A second shaft hole is formed in the rotating part. The base is provided with a rotating shaft adapted to the second shaft hole.

Preferably, a movable hole which is vertical to and communicates with the first shaft hole is also formed in the body part, and the driving piece passes through the movable hole and is adaptively connected with the driving fitting piece.

Preferably, the driving piece is arranged as a screw, and the driving fitting piece is arranged to adapt to a cylindrical nut of the driving piece.

Preferably, the base includes a base plate, a side plate vertically extending from the base plate, and a top plate connected to the side plate and parallel to the base plate. The side plate and the top plate are mounted and accommodated in the mounting tube. The base plate also includes a periphery which is mounted against an end face of the mounting tube. The base plate, the side plate and the top plate enclose an accommodation space. The rotating shaft and the open hole are respectively formed on the side plate. The locking piece is accommodated in the accommodation space. A first through hole corresponding to the movable hole is formed in the top plate. A second through hole corresponding to the movable hole is formed in the base plate. The driving piece passes through the first through hole and the second through hole. The locking assembly also includes a locating part, and the locating part is in limited fit with the driving piece outside the base plate.

Preferably, the locking piece includes a body part and a rotating part fixedly connected with the body part. The body part is rotatably connected with the driving fitting piece. The rotating part is rotatably connected with the mounting tube. The driving fitting piece can drive the body part to move so as to drive the rotating part to rotate relative to the base, so that an end part, away from the rotating part, of the body part extends out of or receives the opening.

Preferably, a first shaft hole is formed in the body part. The driving fitting piece is correspondingly accommodated in the first shaft hole. A second shaft hole is formed in the rotating part. The mounting tube is provided with a rotating shaft adapted to the second shaft hole.

Preferably, a movable hole which is vertical to and communicates with the first shaft hole is also formed in the body part, and the driving piece passes through the movable hole and is adaptively connected with the driving fitting piece.

Preferably, the driving piece is arranged as a screw, and the driving fitting piece is arranged to adapt to a cylindrical nut of the driving piece.

In the second aspect, the embodiment of the present disclosure also provides a transportation bracket, including a mounting base and the bracket connecting structure according to the first aspect. The mounting base is fixed to traffic facilities and includes a seat tube for accommodating the mounting tube, the mounting tube can be accommodated in the seat tube, and the locking piece can abut against and lock the seat tube.

According to the bracket connecting structure in the present disclosure, the driving fitting piece can be controlled to move by operating the driving piece. The locking piece is relatively and rotatably connected with the mounting tube. The driving fitting piece is driven by the driving piece so as to drive the locking piece to rotate relative to the mounting tube. One end of the locking piece is connected to the mounting tube, and the rotational amplitude of the other opposite end is large, so that the locking piece extends out of or receives into the opening of the mounting tube, and the locking and release cooperation of the locking piece to the external mounting structure is realized. According to the bracket connecting structure and the transportation bracket, the structure is stable and convenient to mount, the bracket stability and mounting efficiency can be greatly promoted, and the structure is simple, so that the bracket connecting structure and the transportation bracket are suitable for large-scale application in industrial production.

DETAILED DESCRIPTION OF THE EMBODIMENTS

Figure 1:
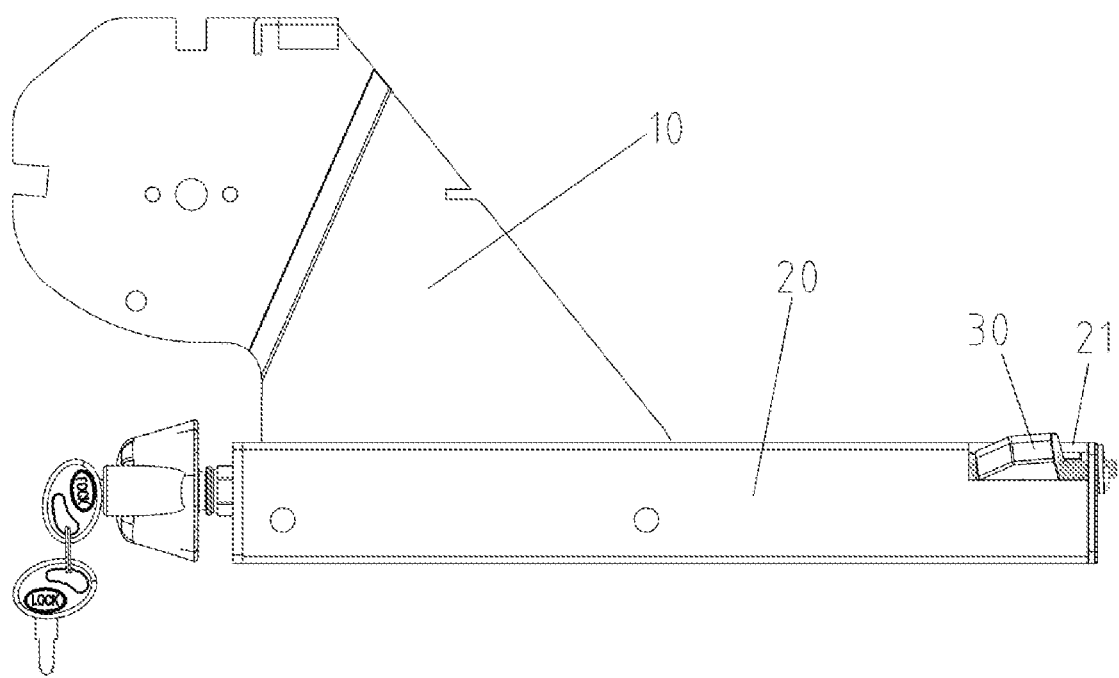
FIG. 1 is a side-looking structural schematic diagram of a bracket connecting structure provided by the embodiment of the present disclosure.
Figure 2:
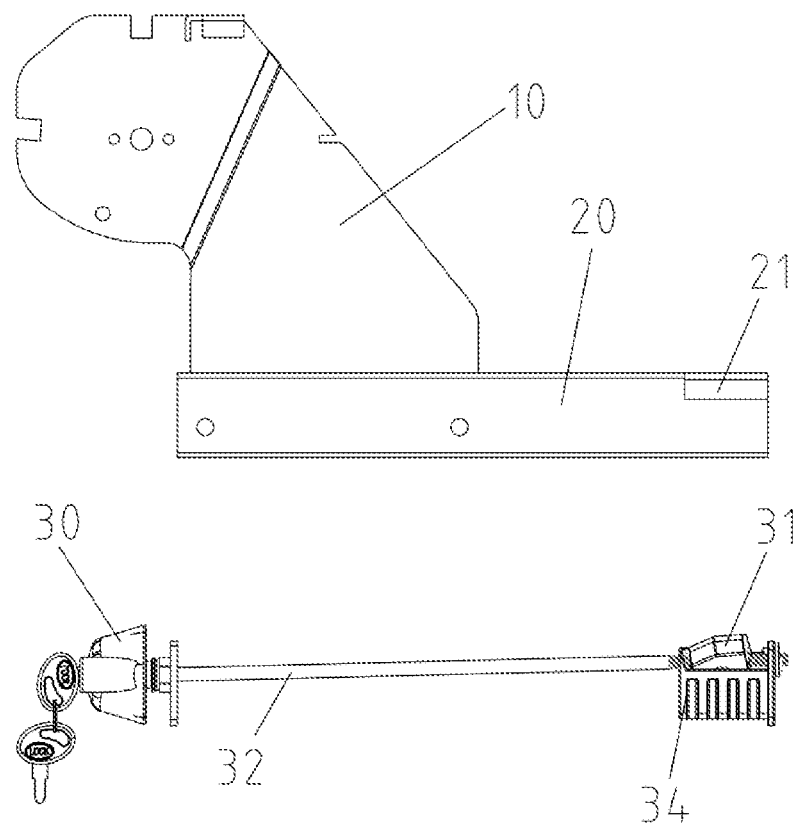
FIG. 2 is a local dismantling structural schematic diagram of a bracket connecting structure in FIG. 1.
Figure 3:
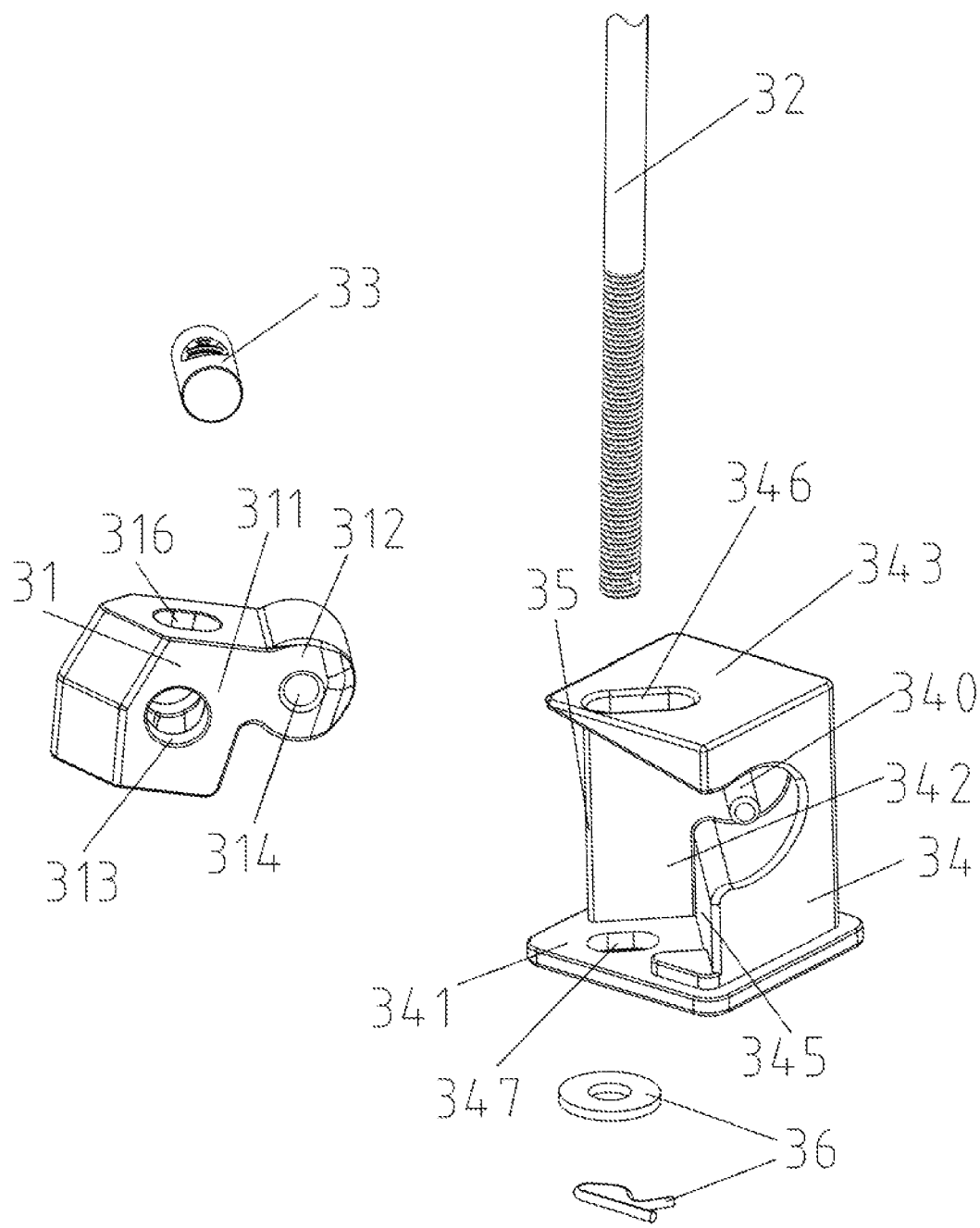
FIG. 3 is a dismantling structural schematic diagram of a locking assembly in FIG. 2.

Embodiments of the present disclosure are described in detail below, and examples of the embodiments are illustrated in the attached figures, wherein same or similar mark numbers refer to the same or similar elements or elements with the same or similar function throughout. The embodiments described below by reference to the attached figures are exemplary and aims to explain the present disclosure and are not to be construed as limiting the present disclosure.

The following disclosure provides many different embodiments or examples for implementing different structures of the present disclosure. The components and arrangements of specific examples are described below in order to simplify the present disclosure. Of course, the components and arrangements are only examples, but are not intended to limit the present disclosure. Furthermore, the present disclosure may repeat reference numbers and/or letters in different examples. This repetition is for the purposes of simplicity and clarity and does not dictate a relationship between the various embodiments and/or settings discussed. In addition, the present disclosure provides examples of various specific processes and materials, but those skilled in the art may realize the application of other processes and/or the use of other materials.

Referring to FIG. 1 to FIG. 5, in the first aspect, the embodiment of the present disclosure provides a bracket connecting structure 100 used for being detachably connected to traffic facilities, such as automobiles. And then, a bracket structure is further connected by the bracket connecting structure 100. The bracket structure can be used for bearing bicycles, packing boxes and the like. The present disclosure describes a bracket connecting structure of a bicycle bracket as an example.

A bracket connecting structure 100 includes a bracket mounting piece 10, a mounting tube 20 connected with the bracket mounting piece 10, and a locking assembly 30 arranged on the mounting tube 20. The locking assembly 30 includes a locking piece 31, a driving piece 32 and a driving fitting piece 33 which are arranged in the mounting tube 20. The locking piece 31 is arranged in the mounting tube 20 in rotating connection with the mounting tube 20. The driving fitting piece 33 is rotatably connected with the locking piece 31. The driving piece 32 runs through the mounting tube 20 and is adaptively connected with the driving fitting piece 33. An opening 21 corresponding to the locking piece 31 is formed in the mounting tube 20. The driving fitting piece 33 is configured to be driven by the driving piece 32 to drive the locking piece 31 to rotate relative to the mounting tube 20, so that the locking piece 31 partially extends out of or receive into the opening 21.

In the embodiment, through the cooperation between the driving piece 32 and the driving fitting piece 33, the driving fitting piece 33 can be driven to move relatively by operating the driving piece 32, and then the locking piece 31 is driven to move relatively locally. Because the movement of the locking piece 31 is limited in a direction relative to the rotating position of the mounting tube 20, the rotating movement of the locking piece 31 is finally realized by operating the driving piece 32. The locking piece 31 rotates relative to the mounting tube 20. In the process of rotating in one direction, the locking piece 31 gradually inclines relative to the mounting tube 20. Correspondingly, the part of the locking piece 31 located at the opening 21 of the mounting tube 20 gradually inclines and protrudes, and then the function similar to "a locking dog" is realized to adaptively lock with an external mounting structure. In the case of locking, according to the operation in the opposite direction, reversing rotation of the locking piece 31 can be realized correspondingly, and the function of "a locking dog" retracting into the opening 21 can be realized, so that the external mounting structure can be released to unlock.

Further, the locking assembly 30 also includes a base 34. The base 34 is detachably mounted at one end of the mounting tube 20. The locking piece 31 is accommodated in the base 34 and rotatably connected with the base 34. An open hole 35 corresponding to the opening 21 is formed in the base 34. It can be understood that in the embodiment, the base 34 is provided to realize the modular structure of the locking assembly 30, and the modular assembly is realized before the modular structure is mounted in the mounting tube 20, so that the structure is more stable and the assembly and disassembly are convenient. It can be understood that in other embodiments, the base 34 may also be omitted. Accordingly, the locking piece 31 is arranged in the mounting tube 20, and only the relative movement and driving mode of the locking piece 31 with respect to the mounting tube 20 are required.

Further, the axial direction of relative rotation of the locking piece 31 and the driving fitting piece 33 and the axial direction of relative rotation of the locking piece 31 and the mounting tube 20 are vertical to the length direction of the mounting tube 20, respectively. In the embodiment, two axial directions of relative rotation are arranged to be vertical to the longitudinal direction of the mounting tube 20, so that the mounting space of the mounting tube 20 is maximized, and the relative movement of the locking piece 31 relative to the mounting tube 20 is driven in an appropriate direction. It can be understood that in other embodiments, the axial direction of relative rotation can also be other directions instead of being vertical to the mounting tube, and only the rotation of the locking piece 31 relative to the mounting tube 20 is required.

Specifically, the locking piece 31 includes a body part 311 and a rotating part 312 fixedly connected with the body part 311. The body part 311 is rotatably connected with the driving fitting piece 33. The rotating part 312 is rotatably connected with the base 34. The driving fitting piece 33 can drive the body part 311 to move so as to drive the rotating part 312 to rotate relative to the base 34, so that an end part, away from the rotating part 312, of the body part 311 extends out of or receives the opening 21. In the embodiment, the locking piece 31 is divided into two parts which are rotatably fit to the driving fitting piece 33 and the base 34, respectively. When the driving fitting piece 33 is driven by operating the driving piece 32, the relative movement of the locking piece 31 in fit with the body part 311 of the driving fitting piece 33 can be realized, and then the locking piece 31 rotates relative to the mounting tube 20 with the rotating part 312 as a shaft part to realize locking and unlocking.

Further, a first shaft hole 313 is formed in the body part 311. The driving fitting piece 33 is correspondingly accommodated in the first shaft hole 313. A second shaft hole 314 is formed in the rotating part 312. The base 34 is provided with a rotating shaft 340 adapted to the second shaft hole 314. In the embodiment, the connecting structure with relative rotation is arranged as a hole-shaft matched structure, and the relative arrangement relationship between a hole and a shaft can also be changed as long as the relative rotation relationship is satisfied.

Further, a movable hole 316 which is vertical to and communicates with the first shaft hole 313 is also formed in the body part 312, and the driving piece 32 passes through the movable hole 316 and is adaptively connected with the driving fitting piece 33. In the embodiment, the driving fitting piece 33 moves relatively in the longitudinal direction of the driving piece 32, and the driving fitting piece 33 is arranged in the locking piece 31, so the driving piece 32 actually passes through the locking piece 31, and the transmission mode is relatively stable for better structural utilization. It can be understood that in other embodiments, the driving piece 32 may not be arranged to pass through the locking piece 31. Correspondingly, the movable hole 316 does not need to be formed in the locking piece 31, so long as the operation of the driving piece 32 can drive the driving fitting piece 33 to move, for example, the driving fitting piece 33 is adaptively connected at the side of the locking piece 31.

Specifically, the driving piece 32 is arranged as a screw, and the driving fitting piece 33 is arranged to adapt to a cylindrical nut of the driving piece 32. In the embodiment, the driving piece 32 is in screw-thread fit with the driving fitting piece 33, and the locking piece 31 is driven by rotating the driving piece 32, so the operational motion can be effectively slowed down, and the locking action and unlocking action can be realized more stably. It can be understood that in other embodiments, the driving piece 32 may also be arranged to be other matched structures, so that the operation of the driving piece 32 can drive the driving fitting piece 33 to move.

Specifically, the base 34 includes a base plate 341, a side plate 342 vertically extending from the base plate 341, and a top plate 343 connected to the side plate 342 and parallel to the base plate 341. The side plate 342 and the top plate 343 are mounted and accommodated in the mounting tube 20. The base plate 341 also includes a periphery 344 which is mounted against an end face of the mounting tube 20. The base plate 342, the side plate 343 and the top plate 343 enclose an accommodation space 345. The rotating shaft 340 and the open hole 35 are respectively formed on the side plate 342. The locking piece 31 is accommodated in the accommodation space 345. A first through hole 346 corresponding to the movable hole 316 is formed in the top plate 343. A second through hole 347 corresponding to the movable hole 316 is formed in the base plate 341. The driving piece 32 passes through the first through hole 346 and the second through hole 347. The locking assembly 30 also includes a locating part 36. The locating part 36 is in limited fit with the driving piece 32 outside the base plate 341. In the embodiment, the specific structure of the base 34 fully improves the space utilization and structural stability, but in other embodiments, the structure of the base 34 is not limited to this.

Figure 4:
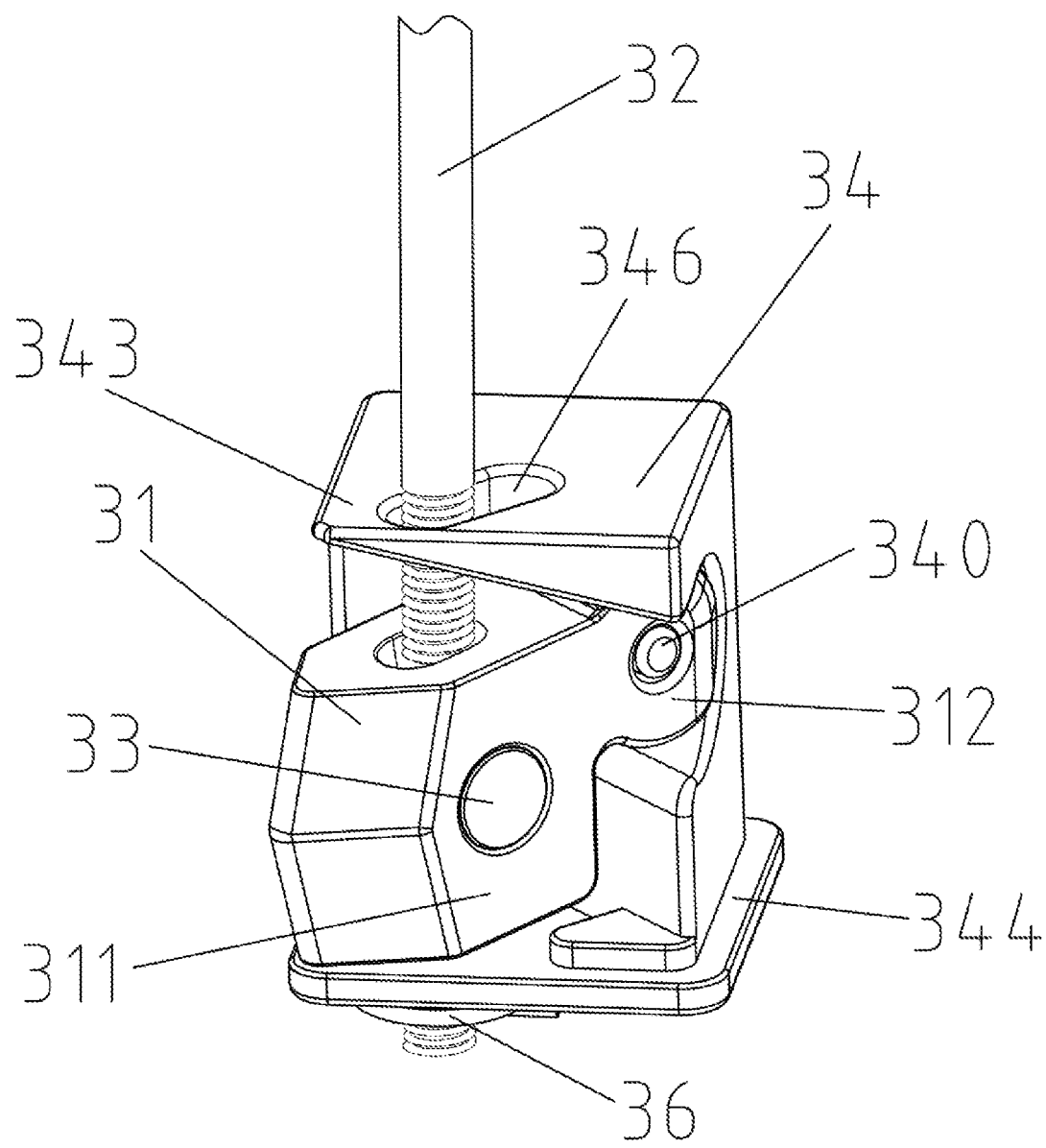
FIG. 4 is an assembly structural schematic diagram of a locking assembly in FIG. 2.
Figure 5:
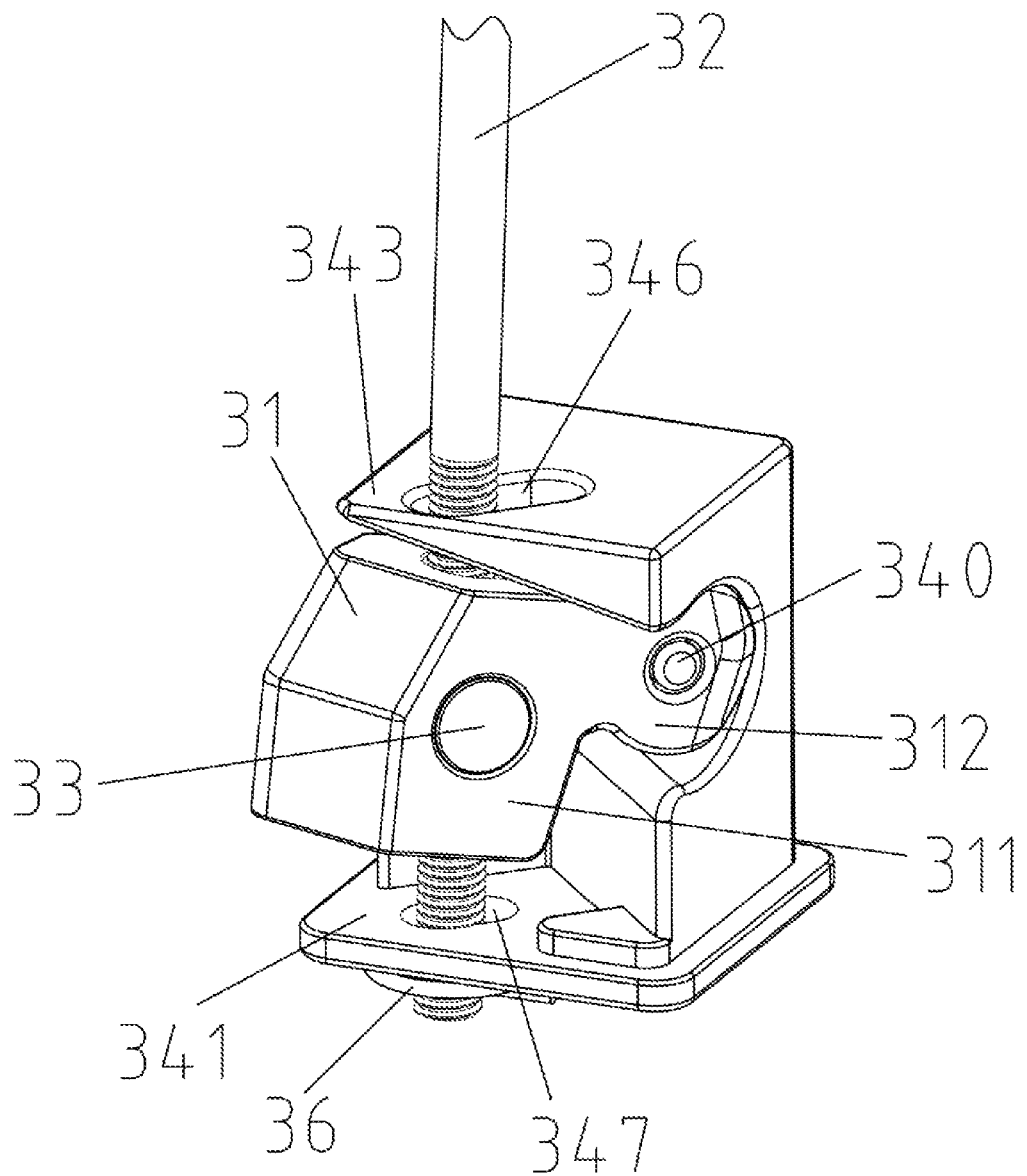
FIG. 5 is a stereochemical structural schematic diagram of a locking assembly in another state in FIG. 4.

Referring to FIG. 4 and FIG. 5, the working process of the bracket connection structure 100 is described as follows.

Wherein, FIG. 4 is in an unlocked state of a bracket connecting structure 100, and FIG. 5 is in a locked state of a bracket connecting structure 100.

In the unlocked state, the locking piece 31 remains to receive into the mounting tube 20. When the driving piece 32 is operated to rotate clockwise, the driving fitting piece 33 is in screw-thread fit with the driving piece 32 to generate displacement relative to the driving piece 32. The displacement is approximately along the length direction of the mounting tube 20. The driving fitting piece 33 drives the body part 311 of the locking piece 31 to generate displacement. The rotating part 312 of the locking piece 31 serves as a shaft part, and the locking piece 31 is rotatably inclined as a whole. The body part 311 rotates close to the top plate 343. The tilt angle of the part, facing away from the rotating part 312, of the body part 311 is the largest, and the body part 311 gradually extends out of the opening 21 with rotation. The surface, facing away from the rotating part 312, of the body part 312 correspondingly abuts against an inner surface of the mounting structure outside the mounting tube 20 so as to realize locking.

By reverse operation of the above operation, it is possible to control the driving piece 32 to drive the driving fitting piece 33 so as to drive the locking piece 31 to rotate and reset from the locked state to the unlocked state, so that the unlocking of the bracket connecting structure 100 is realized, and then the disassembly actions can be carried out.

According to the bracket connecting structure, a first pushing block can move away from the sliding locking piece by rotating the screw, and a first pushing surface of the first pushing block correspondingly pushes a second pushing surface, so that the second pushing block slides out of the mounting tube, so that the locking cooperation with the external seat tube is realized, and the bracket connecting structure can be quickly mounted and fixed. When the screw rotates in the reverse direction, the first pushing block gets close to the sliding locking piece, and the second pushing block is contracted, so that the connection with the external seat tube is released, and the bracket connecting structure is convenient to disassemble. According to the bracket connecting structure and the transportation bracket, the structure is stable and convenient to mount, the bracket mounting efficiency can be improved, and the structure is simple, so that the bracket connecting structure and the transportation bracket are suitable for large-scale application in industrial production.

In the second aspect, the embodiment of the present disclosure also provides a transportation bracket, including a mounting base and the bracket connecting structure according to the first aspect. The mounting base is fixed to traffic facilities and includes a seat tube for accommodating the mounting tube, the mounting tube can be accommodated in the seat tube, and the locking piece can abut against and lock the seat tube.

In the description of the specification, the description of the reference terms such as "one embodiment", "some embodiments", "examples", "specific examples" or "some examples" indicates to be contained in at least one embodiment or example of the disclosure in combination with specific characteristics, structures, materials or characteristics described by the embodiment or example. In the specification, schematic expression of the above terms does not necessarily refer to the same embodiment or example. Moreover, the described specific features, structures, materials or characteristics can be combined in any one or more embodiments or examples appropriately. In addition, those skilled in the art can integrate and combine different embodiments or examples and features of different embodiments or examples described in this specification without contradicting each other.

Although the embodiments of the present disclosure have already been illustrated and described, various changes, modifications, replacements and transformations can be made by those skilled in the art under the condition of without departing from the spirit and the scope of the present disclosure, and thus the scope of the present disclosure should be restricted by claims and equivalent scopes thereof.

What is claimed is:

1. A bracket connecting structure, including a bracket mounting piece, a mounting tube connected with the bracket mounting piece, and a locking assembly arranged on the mounting tube, wherein the locking assembly includes a locking piece, a driving piece and a driving fitting piece which are arranged in the mounting tube, the locking piece is arranged in the mounting tube in rotating connection with the mounting tube, the driving fitting piece is rotatably connected with the locking piece, the driving piece runs through the mounting tube and is adaptively connected with the driving fitting piece, an opening corresponding to the locking piece is formed in the mounting tube, the driving fitting piece is configured to be driven by the driving piece to drive the locking piece to rotate relative to the mounting tube, so that the locking piece partially extends out of or is received into the opening;
wherein the locking assembly also includes a base, the base is detachably mounted at one end of the mounting tube, the locking piece is accommodated in the base and rotatably connected with the base, and an open hole corresponding to the opening is formed in the base.

2. The bracket connecting structure according to claim 1, wherein the axial direction of relative rotation of the locking piece and the driving fitting piece and the axial direction of relative rotation of the locking piece and the mounting tube are perpendicular to the length direction of the mounting tube, respectively.

3. The bracket connecting structure according to claim 2, wherein the locking piece includes a body part and a rotating part fixedly connected with the body part, the body part is rotatably connected with the driving fitting piece, the rotating part is rotatably connected with the base, and the driving fitting piece can drive the body part to move so as to drive the rotating part to rotate relative to the base, so that an end part, away from the rotating part, of the body part extends out of or is received into the opening.

4. The bracket connecting structure according to claim 3, wherein a first shaft hole is formed in the body part, the driving fitting piece is correspondingly accommodated in the first shaft hole, a second shaft hole is formed in the rotating part, and the base is provided with a rotating shaft adapted to the second shaft hole.

5. The bracket connecting structure according to claim 4, wherein a movable hole which is perpendicular to and communicates with the first shaft hole is also formed in the body part, and the driving piece passes through the movable hole and is adaptively connected with the driving fitting piece.

6. The bracket connecting structure according to claim 5, wherein the driving piece is arranged as a screw, and the driving fitting piece is a cylindrical nut of the driving piece.

7. The bracket connecting structure according to claim 6, wherein the base includes a base plate, a side plate perpendicularly extending from the base plate, and a top plate connected to the side plate and parallel to the base plate, the side plate and the top plate are mounted and accommodated in the mounting tube, the base plate also includes a periphery which is mounted against an end face of the mounting tube, the base plate, the side plate and the top plate enclose an accommodation space, the rotating shaft and the open hole are respectively formed on the side plate, the locking piece is accommodated in the accommodation space, a first through hole corresponding to the movable hole is formed in the top plate, a second through hole corresponding to the movable hole is formed in the base plate, the driving piece passes through the first through hole and the second through hole, and the locking assembly also includes a locating part, and the locating part is in limited fit with the driving piece outside the base plate.

8. The bracket connecting structure according to claim 1, wherein the locking piece includes a body part and a rotating part fixedly connected with the body part, the body part is rotatably connected with the driving fitting piece, the rotating part is rotatably connected with the mounting tube, and the driving fitting piece can drive the body part to move so as to drive the rotating part to rotate relative to the base, so that an end part, away from the rotating part, of the body part extends out of or is received into the opening.

9. The bracket connecting structure according to claim 8, wherein a first shaft hole is formed in the body part, the driving fitting piece is correspondingly accommodated in the first shaft hole, a second shaft hole is formed in the rotating part, and the mounting tube is provided with a rotating shaft adapted to the second shaft hole.

10. The bracket connecting structure according to claim 9, wherein a movable hole which is perpendicular to and communicates with the first shaft hole is also formed in the body part, and the driving piece passes through the movable hole and is adaptively connected with the driving fitting piece.

11. The bracket connecting structure according to claim 10, wherein the driving piece is arranged as a screw, and the driving fitting piece is a cylindrical nut of the driving piece.

12. A transportation bracket, comprising a mounting base and the bracket connecting structure according to claim 1, wherein the mounting base is fixed to traffic facilities and comprises a seat tube for accommodating the mounting tube, the mounting tube can be accommodated in the seat tube, and the locking piece can abut against and lock the seat tube.

13. A transportation bracket, comprising a mounting base and the bracket connecting structure according to claim 2, wherein the mounting base is fixed to traffic facilities and comprises a seat tube for accommodating the mounting tube, the mounting tube can be accommodated in the seat tube, and the locking piece can abut against and lock the seat tube.

14. A transportation bracket, comprising a mounting base and the bracket connecting structure according to claim 3, wherein the mounting base is fixed to traffic facilities and comprises a seat tube for accommodating the mounting tube, the mounting tube can be accommodated in the seat tube, and the locking piece can abut against and lock the seat tube.

15. A transportation bracket, comprising a mounting base and the bracket connecting structure according to claim 4, wherein the mounting base is fixed to traffic facilities and comprises a seat tube for accommodating the mounting tube, the mounting tube can be accommodated in the seat tube, and the locking piece can abut against and lock the seat tube.

16. A transportation bracket, comprising a mounting base and the bracket connecting structure according to claim 5, wherein the mounting base is fixed to traffic facilities and comprises a seat tube for accommodating the mounting tube, the mounting tube can be accommodated in the seat tube, and the locking piece can abut against and lock the seat tube.

17. A transportation bracket, comprising a mounting base and the bracket connecting structure according to claim 6, wherein the mounting base is fixed to traffic facilities and comprises a seat tube for accommodating the mounting tube, the mounting tube can be accommodated in the seat tube, and the locking piece can abut against and lock the seat tube.

18. A transportation bracket, comprising a mounting base and the bracket connecting structure according to claim 7, wherein the mounting base is fixed to traffic facilities and comprises a seat tube for accommodating the mounting tube, the mounting tube can be accommodated in the seat tube, and the locking piece can abut against and lock the seat tube.

\* \* \* \* \*